Oct. 15, 1968   E. HAAS   3,405,965
TRANSPORT SAFETY COUPLER
Filed July 18, 1966
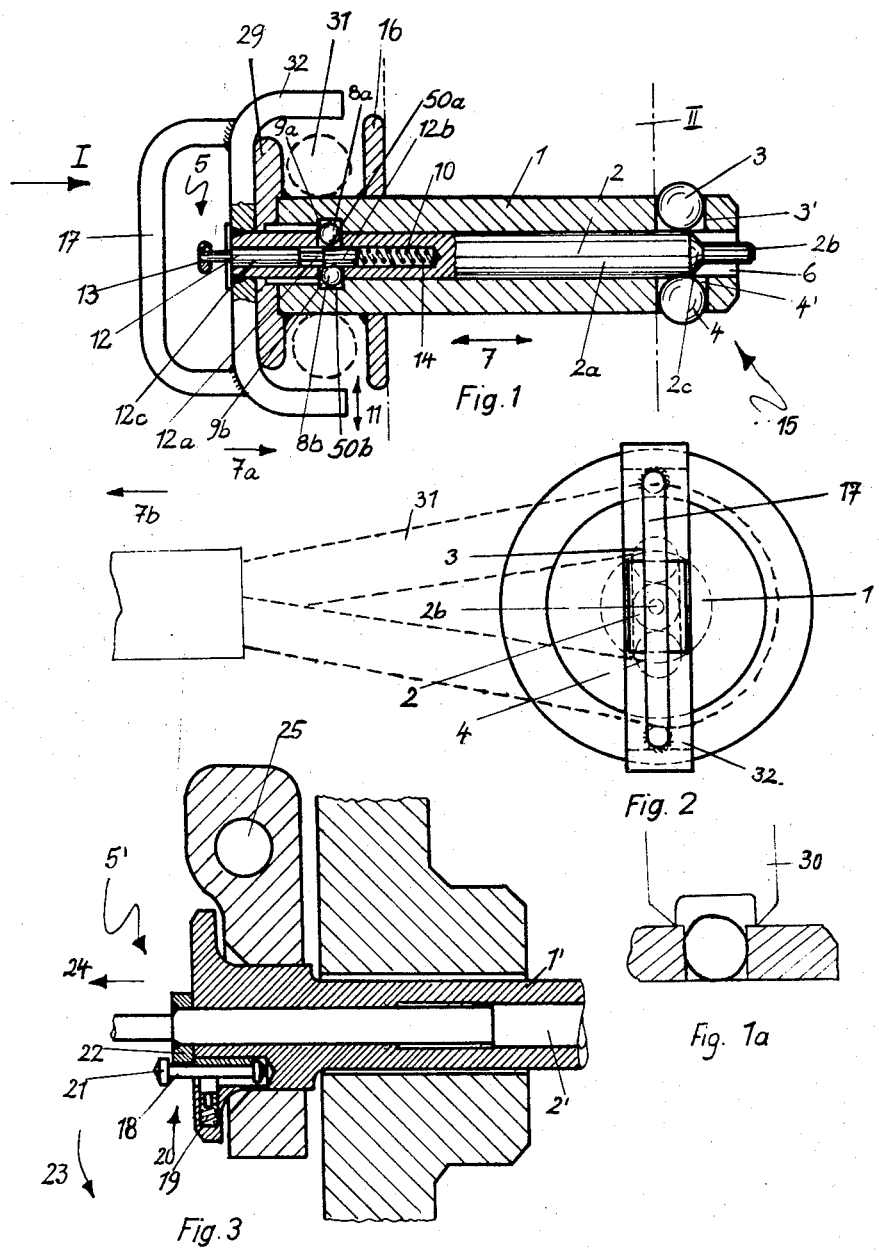
INVENTOR
EBERHARD HAAS.
BY *Otto John Munz*
ATTORNEY

3,405,965
TRANSPORT SAFETY COUPLER
Eberhard Haas, Heilbronn (Neckar), Germany, assignor to Messrs. August Laepple G.m.b.H. & Co.
Filed July 18, 1966, Ser. No. 566,071
Claims priority, application Germany, July 20, 1965, L 51,175
10 Claims. (Cl. 294—83)

ABSTRACT OF THE DISCLOSURE

An actuating rod is slidably situated in the axial bore of a shaft whose external dimensions have been chosen to allow its insertion through an opening in a heavy object. The actuating rod has two differently diametered portions connected by a truncated conical surface. Metal spheres are located in radially directed races in that end of the housing which passes through the opening of the object. These metal spheres are pushed out to protrude beyond the periphery of the housing, after its insertion into the opening, by movement of the actuating rod until its large diametered portion registers with the races. The protruding spheres can lock with the inner well of the opening. Retraction of the rod until its small-diametered portion registers with the races allows the spheres to fall back for extraction and insertion of the housing. A similarly operating rod-ball-race mechanism enables releasable locking of the actuating rod to the housing, so that registration of the large diametered portion with the race of the housing is maintained, thus assuring safe holding of the protruding spheres in contact with the inner wall of the opening.

BACKGROUND OF THE INVENTION

The invention relates to a transport safety coupler and more especially to a coupler of the aforesaid kind which, in the transport of heavy loads or objects, for example, of parts of steel or cast iron, tools for car bodies, etc., by means of lifting gear, for example, hoists, etc., serves to effectuate the connection between the member of the lifting gear taking up the load and the object or the load to be transported or conveyed.

SUMMARY OF THE INVENTION

It is an object of this invention to provide a coupler of the aforesaid kind with which the connection between the member of the lifting gear taking up the load and the object or load to be conveyed or transported is reliable and can easily be effectuated.

Another object of this invention is to provide a coupler of the general character described with which the aforesaid connection can easily be effectuated with only a few manipulations and without expensive preparatory measures.

A further object of this invention is to provide a coupler of the aforementioned character which is simple in construction and the manufacture of which is also simple and inexpensive.

A still further object of this invention is to provide a coupler of the aforedescribed type which can be used in all places where heavy pieces such as pieces of pig-iron castings have to be handled.

Still another object of the invention is to provide a coupler of the character described which comprises in combination: a housing having an end on the side facing the operator and an end on the side facing the load or object to be transported or conveyed, fastening means for effectuating when in operative position a connection between the said housing and the said load or object to be transported or conveyed, said fastening means being guided in the said housing so as to be movable to and fro between an advanced engaged or locking position and a retracted inoperative position; an actuating organ mounted in said housing, said actuating organ being guided in a cavity of said housing so as to be movable to and fro between an inoperative position and an actuating position, said actuating position of said organ being assocated with or allotted to said advanced engaged or locking position of said fastening means, the arrangement being thereby such that said organ when in its actuating position urges said fastening means into their advanced engaged or locking position; a locking device on said housing, said locking device being movable to and fro between an operative position and an inoperative position, said locking device when in its operative position serving to maintain and secure the said actuating organ in its actuating position; and a connecting means on said housing serving to establish or effectuate a releasable connection between the said housing and the receiving member of the lifting gear.

These and other objects, features and advantages of the present invention will become further apparent from the following detailed description thereof.

Embodiments of the present invention will now be described, by way of example, with reference to the accompanying drawings, in which:

BRIEF DESCRIPTION OF THE DRAWING

FIG. 1 is a partly sectional side view of a first embodiment of the invention,

FIG. 1a is a side view on a larger scale of a detail of the arrangement shown in FIG. 1, FIG. 2 is a view according to arrow I of the arrangement shown in FIG. 1, and FIG. 3 is a partly sectional side view of a modified embodiment of the invention.

DESCRIPTION OF THE PREFERRED EMBODIMENTS

With the arrangement according to FIGS. 1 and 2, the new transport safety coupler for the transport of heavy loads consists of a housing 1, an actuating organ 2, fastening means 3 and 4 and a locking device 5. The fastening means are constructed as balls, glidingly guided within the radial channels 3′ and 4′ of the housing 1 serving to guide the actuating organ 2. As for the said balls, they are so guided within their channels that they can be moved to and fro between a retracted position in which they do not project beyond the periphery of the housing 1 and an advanced, locking position in which they engage behind a projecting wall II of the load or the object to be transported. The actuating organ 2 is a bolt- or rod-like element which is axially movably guided according to the arrow 7 to and fro within the bore 6 of the housing 1. This actuating organ 2 consists of three parts 2a, 2b and 2c; the part or portion 2a has a greater diameter and is alloted or associated to the advanced locking position of the fastening means whereas the part or portion 2b has a smaller diameter and is arranged in the region of the end opposite to the operator, said part or portion 2b being alloted or associated to the retracted, housing-insertion-extraction position of the fastening means 3, 4. As for the part 2c, it has the form of a truncated cone tapering towards the end 2b and connecting the parts 2a and 2b axially arranged behind each other and differing, as already said, in their diameters. The housing 1 has the form of a cylinder the axial bore 6 of which is a through bore and which has the radial channels 3′ and 4′. This bore 6 is referred to in the claims as the first bore. To prevent the balls from falling out of their respective radial channels, the portion of the wall which surrounds the outlets of the said channels is pressed inwards by means of a so-called pressing iron 30 (FIG. 2); turned or directed inwards as it is, the said portion will press back the balls, during pulling out of the actuating organ 2.

The locking device 5 serves to fix the actuating organ in its effective position. This locking device has at least two locking means 8a and 8b constructed, for example, as balls and guided in cavities or depressions 9a and 9b of the inner periphery of the axial bore 10 of the actuating organ 2 so as to be movable according to arrow 11 to and fro.

Moreover, the locking device 5 has a rod-like operating member 12 with a part 12a smaller in diameter than the remnant part of the rod and coordinated to the retracted position of the locking means, said operating member 12 being movable according to the arrow 7 axially between a position in which the locking means bear against the periphery of that part of the rod with the smaller diameter and a position in which the locking means bear against the periphery of the other part of the rod which has the greater diameter. The operating member 12 is arranged together with the locking means 8a, 8b seated on its circumference or periphery within the bore 10 of the operating organ 2 in concentric arrangement therewith in such a manner that its one end protrudes with regard to the actuating organ 2 on the side facing the operator at 13. Moreover, the said operating member 12 is biased by the spring 14 which is accommodated within the bore 10 of the actuating organ 2 in a way that one of its ends bears against the bottom of the bore, whereas the opposite end of it bears against the operating member 12 and has the tendency to push it out in such a manner that the locking means bear against the periphery of the portion of the rod having the greater diameter. For purposes of clarity, the bore 10 of the actuating organ is referred to in the claims as the second bore.

The device operates in the following way:

At the beginning the actuating organ 2 is in its retracted position with the effect that the end 2b is situated within the bore 6 of the housing 1 and the balls 3 and 4 bear against the end 2b with the smaller diameter in such a manner that they do not project out of their respective radial channels 3' and 4' because of the smaller diameter of the end in question. Consequently, the housing 1 has a cylindrical periphery and is free from any parts projecting beyond the periphery of the cylinder. In this position, the housing 1 is inserted into a bore provided for that very purpose in the wall II of the object to be conveyed or transported until the end portion 15 projects inwards beyond the wall. Now the operating member 12 is pushed inwards in the direction of the arrow 7a, until the portion 12a characterized by its smaller diameter lies face to face with the balls 8a and 8b, and registers therewith, allowing thus these balls to move inward and to give free the actuating organ 2 for free displacement along and within the bore 6. In the following phase the operating organ 2 is pushed inwards until the portion 2a characterized by its greater diameter lies opposite the balls 3 and 4 and registers therewith, pressing and urging them outwards in the radial direction of the arrow 11 so that the balls engage behind the wall II of the object to be transported and interlock the housing 1 with the wall. To maintain and secure the actuating organ 2 in its advanced, actuating position, the operating rod member 12 is caused to displace again, this time in the direction of the arrow 7b under the influence of the pressure of the spring 14, until the portion 12b characterized by its greater diameter lies opposite the balls 8a and 8b and registers therewith thus pressing and urging them outwards in the radial direction of the arrow 11 and making them enter into the cavities or depressions 9a and 9b to protrude in locking engagement into the catch indentations 50a and 50b provided in the surface of the bore 6. This is just the moment for the actuating organ 2 to be finally fixed and locked in its forward advanced position.

At the end facing the operator the housing is provided with two rings or collars 29 and 16 that are coaxial and parallel with one another and axially spaced from one another a rope 31 or a hook or something similar is laid round the housing as shown in FIG. 1 to bring about the connection between the safety coupler and the lifting gear. The rings 29 and 16 have to serve as connecting elements for effecting a releasable connection between the coupler and the receiving member of the lifting gear that has to take up the load. In addition to that, provision is made for a yoke or frame 32 with a U-like cross-section to prevent the rope or loop from slipping or gliding off the coupler.

Moreover, the housing is equipped with a handle 17 provided on the end facing the operator in order to facilitate the use of the device, that is, to get easily hold of it and to displace it without difficulties.

As for the arrangement shown in FIG. 3, we have again to do with an actuating organ 2' axially displaceable to and fro within a housing 1', only that the locking device 5' in modified. This device 5' has a locking member 18 coordinated or allotted to, or associated with, the actuating organ 2' and mounted on the housing of the pivot in question in a way that it can be turned or pivoted to and fro against the action of a spring between a backward retracted position and a locking position in which by means of an abutment it engages behind a projecting portion of the actuating organ 2' in its forward or advanced position. The said locking member consists of a bolt which is parallel to the actuating organ 2', and is pivotally mounted with its front end on the housing 1' of the coupler in question, and stands under the influence of a spring 19 engaging it approximately in the middle area between its ends and acting upon it in the radial direction of the arrow 20 and urging it hereby toward the actuating organ. At the end facing the operator the bolt is provided with a head 21, which in the advanced position of the actuating organ engages behind a counterface on a projecting portion 22 of this operating organ 2', thus preventing the latter, if it has been pushed forwards, to glide back or return into its backward or retracted position. Therefore, to undo this locked connection, the bolt 18 and its head 21 must be bent down in the sense of the arrow 23 and contrary to the effective resistance or action of the spring in order that the actuating organ can be pulled out or extracted in the direction of the arrow 24.

In the embodiment shown in FIG. 3 the connecting element that has to serve for effecting a releasable connection between the coupler and the receiving member of the lifting gear that has to take up the load is constituted by an eye or loop 25 fixed on the housing on the side that faces the operator. A hook or rope etc. can be fixed or secured thereto to realize the connection with the object or load to be transported.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A transport safety coupler for insertion into an opening in a wall of a heavy object to provide a coupling to a lifting gear, such as a crane, comprising in combination: a housing insertable into said opening a distance greater than the thickness of said wall, whereby an end portion 15 of said housing projects inwards beyond said wall, said housing having a first bore and a catch means 50a, 50b in a surface of said first bore, said housing having a connecting means enabling connection of the housing to a lifting gear; ball-shaped fastening means mounted in the end portion and being adjustable outwards from the end portion into a locking position behind and against said wall and adjustable inwards toward the end portion into a housing-insertion-extraction position; a bolt-shaped actuating organ mounted in the first bore of the housing and movable into and out of an actuating position wherein it contacts and holds said ball-shaped fastening means in said locking position, said actuating organ having a second bore and at least one cavity 9a, 9b extending through the actuating organ between its said second bore and its exterior; a rod-shaped operating member movably situated in said second bore and having a thin region and a thick region; locking means 8a, 8b, one situated in and associated with each of said cavities 9a, 9b, each cavity 9a, 9b being a guiding race for guiding movement of its associated locking means 8a, 8b; said thick and thin regions alternatively registerable with said cavities 9a, 9b, the registering of said thick region with said cavities 9a, 9b bringing said thick region into contact with said locking means 8a, 8b and moving said means 8a, 8b into locking engagement with said catch means, said actuating organ then being fixed in said actuating position; the registering of said thin region with said cavities 9a, 9b releasing said locking means from engagement with said catch means; and spring means biasing said operating member into a position wherein it protrudes from said second bore and wherein said thick region is in registration with said cavities 9a, 9b.

2. The coupler as claimed in claim 1, said actuating organ having the shape of a cylindrical shaft and having two parts namely a first part which has a greater diameter and which holds the fastening means in said locking position, and a second part with a smaller diameter arranged as seen in the insertion direction behind the said first part, said fastening means resting on said second part in said housing-insertion-extraction position.

3. The coupler as claimed in claim 2, wherein between said first part and said second part there is situated a third part having a truncated conical form and interconnecting said first and said second parts.

4. The coupler as claimed in claim 2, wherein said housing has the form of a cylinder having as its said first bore a central axial throughbore which has in its end portion a plurality of radially extending channels extending between the said axial throughbore and the periphery of the said cylinder and serving to guide the ball-shaped fastening means.

5. The coupler as claimed in claim 1, said housing having the shape of a cylindrical shaft, its said first bore being an axial bore passing completely therethrough, said fastening means comprising balls, said housing having radially extending channels for guiding said balls during their outwards and inwards movement, said channels extending between said first bore and the exterior of said housing.

6. The coupler as claimed in claim 1, wherein the direction of the motion of the said fastening means and that of the motion of the actuating organ stand in a right angle to each other.

7. The coupler as claimed in claim 1, wherein the housing has on the end opposite end portion 15 an eye as said connecting means, into which a hook or a rope is introduced for establishing a connection with the load receiving part of the lifting gear that has to take up the load.

8. The coupler as claimed in claim 1, wherein the said housing has on its end opposite end portion 15 as said connecting means two collars parallel to each other and spaced apart in the insertion direction.

9. The coupler as claimed in claim 8, wherein to the said two collars there is coordinated a U-like frame, the two legs of which overlap the interval between the said two collars.

10. The coupler as claimed in claim 1, wherein said housing has a handle on the end opposite end portion 15.

References Cited

UNITED STATES PATENTS

| 718,066 | 1/1903 | McWilliams | 294—86.25 |
| 1,749,827 | 3/1930 | Mack | 294—86.25 |
| 2,928,693 | 3/1960 | Cannon | 294—83 |

FOREIGN PATENTS

| 1,102,639 | 3/1961 | Germany. |

ROBERT G. SHERIDAN, *Primary Examiner.*

F. E. WERNER, *Assistant Examiner.*